United States Patent [19]

Francis

[11] Patent Number: 5,201,147
[45] Date of Patent: Apr. 13, 1993

[54] MARINE BATTERY TERMINAL CLEANER TOOL

[76] Inventor: Daniel L. Francis, 6169 Blue Ribbon, Hillsboro, Ohio 45133

[21] Appl. No.: 874,436

[22] Filed: Apr. 27, 1992

[51] Int. Cl.$^5$ .................. B24B 25/00; B26B 11/00
[52] U.S. Cl. .................. 51/181 R; 15/105; 7/158
[58] Field of Search ............ 51/181 R, 181 NT, 359, 51/360, 361, 391, 392; 7/158; 15/104.04, 105, 236.01, 236.06, 236.05, 236.08

[56] References Cited

U.S. PATENT DOCUMENTS

| | | | |
|---|---|---|---|
| 842,579 | 1/1907 | Peters | 51/391 |
| 1,710,127 | 4/1929 | Vaughn | 15/236.05 |
| 2,204,516 | 6/1940 | Stone | 15/236.06 |
| 2,540,816 | 2/1951 | Farrow | 51/360 |
| 2,562,136 | 7/1951 | Sullins | 15/105 |
| 2,764,769 | 10/1956 | Neuman | 15/105 |
| 3,717,895 | 2/1973 | McFarland | 15/105 |
| 3,802,793 | 4/1974 | Simon | 15/105 |
| 3,946,456 | 3/1976 | Martin et al. | 15/105 |
| 4,055,687 | 10/1977 | Blue | 429/49 |
| 4,255,828 | 3/1981 | Colla | 15/236.01 |
| 4,301,567 | 11/1981 | Tucker | 15/104.04 |
| 4,435,873 | 3/1984 | Pool | 15/105 |
| 4,761,354 | 8/1988 | Poe et al. | 429/121 |

FOREIGN PATENT DOCUMENTS 336785. 2/1936 Italy ........................ 51/360

Primary Examiner—Bruce M. Kisliuk
Assistant Examiner—Bryan Reichenbach
Attorney, Agent, or Firm—Leon Gilden

[57] ABSTRACT

A tool arranged for cleaning marine terminal battery posts is provided with an elongate cylindrical body having first and second end faces. The end faces each include respective first and second sets of radially directed cutting blades mounted orthogonally to the axis of the body. First and second coaxial bores are directed into the first and second end faces of varying diameters to accommodate like diameters of the marine battery terminal posts.

2 Claims, 4 Drawing Sheets

MARINE BATTERY TERMINAL CLEANER TOOL

BACKGROUND OF THE INVENTION

1. Field of the Invention

The field of invention relates to battery cleaning apparatus, and more particularly pertains to a new and improved marine battery terminal cleaner tool wherein the same is directed to accommodate projecting post portions of marine battery terminals.

2. Description of the Prior Art

The cleaning of marine battery terminals is of a particular application in maintenance of wet cell batteries. The terminal posts include projecting externally threaded bosses typically to accommodate threaded fasteners therearound in securing terminals thereto in typical marine applications. Prior art terminal post cleaning structure is provided for and set forth in U.S. Pat. Nos. 4,435,873; 3,717,895; 4,761,354; 4,055,687; and 4,255,828. The prior art has heretofore failed to provide particular structure particularly as set forth by the instant invention to address unique application in the cleaning of marine battery terminals.

Accordingly, there remains a need for a new and improved marine battery terminal cleaning tool as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of battery cleaning apparatus now present in the prior art, the present invention provides a marine battery terminal cleaner tool wherein the same is directed to accommodate the projecting posts of associated marine batteries. As such, the general purpose of the present invention, which will be described subsequently in greater detail, is to provide a new and improved marine battery terminal cleaner tool which has all the advantages of the prior art battery cleaner tool structure and none of the disadvantages.

To attain this, the present invention provides a tool arranged for cleaning marine terminal battery posts, with an elongate cylindrical body having first and second end faces. The end faces each include respective first and second sets of radially directed cutting blades mounted orthogonally to the axis of the body. First and second coaxial bores are directed into the first and second end faces of varying diameters to accommodate like diameters of the marine battery terminal posts.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved marine battery terminal cleaner tool which has all the advantages of the prior art battery cleaning apparatus and none of the disadvantages.

It is another object of the present invention to provide a new and improved marine battery terminal cleaner tool which may be easily and efficiently manufactured and marketed.

It is a further object of the present invention to provide a new and improved marine battery terminal cleaner tool which is of a durable and reliable construction.

An even further object of the present invention is to provide a new and improved marine battery terminal cleaner tool which is susceptible of a low cost of manufacture with regard to both materials and labor, and which accordingly is then susceptible of low prices of sale to the consuming public, thereby making such marine battery terminal cleaner tools economically available to the buying public.

Still yet another object of the present invention is to provide a new and improved marine battery terminal cleaner tool which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
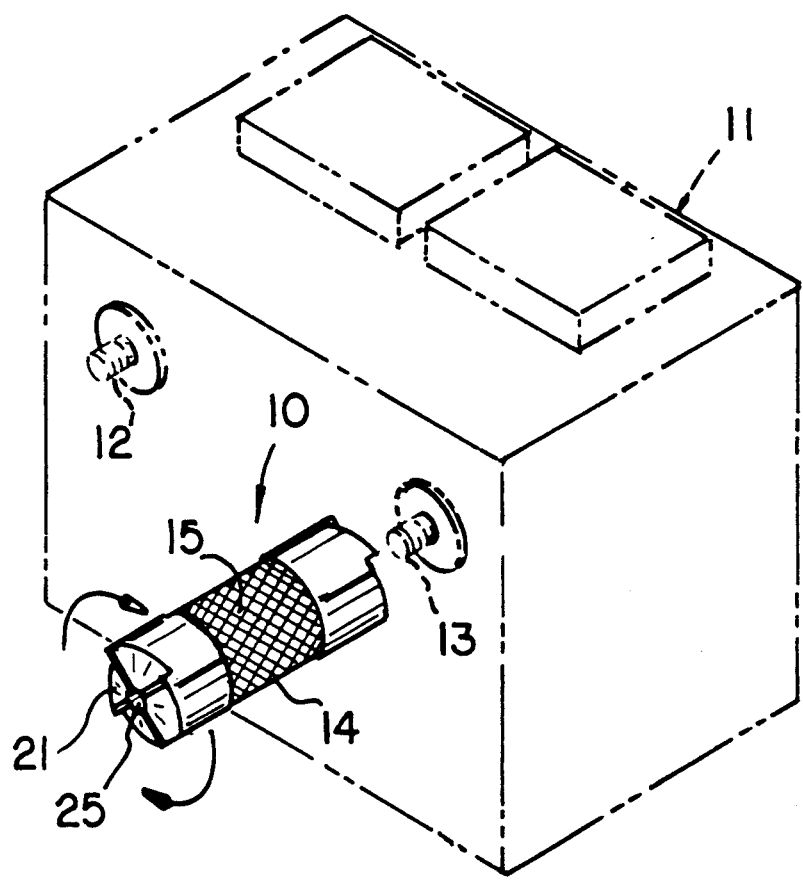
FIG. 1 is an isometric illustration of the instant invention in use.
Figure 2:
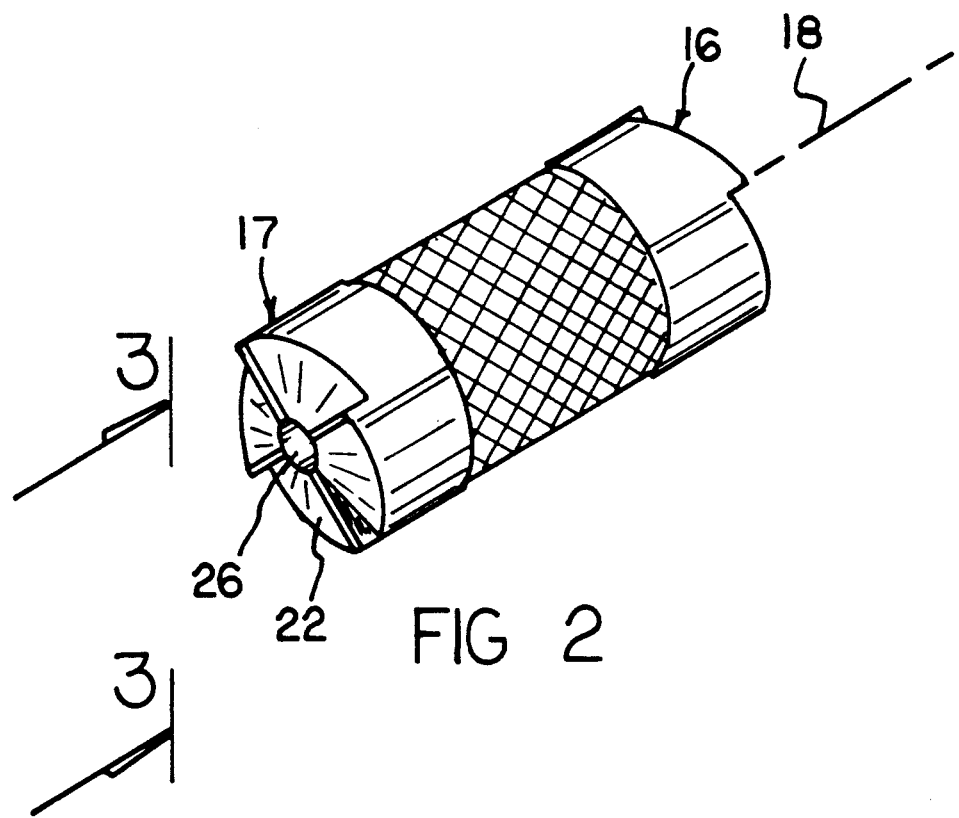
FIG. 2 is an enlarged isometric illustration of the instant invention.
Figure 3:
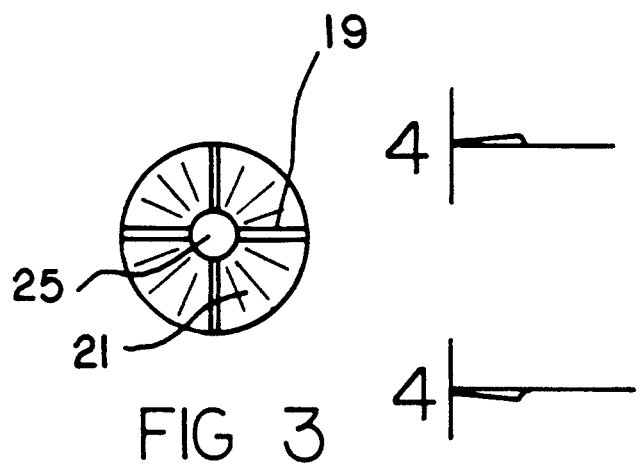
FIG. 3 is an orthographic view, taken along the lines 3—3 of FIG. 2 in the direction indicated by the arrows.
Figure 4:
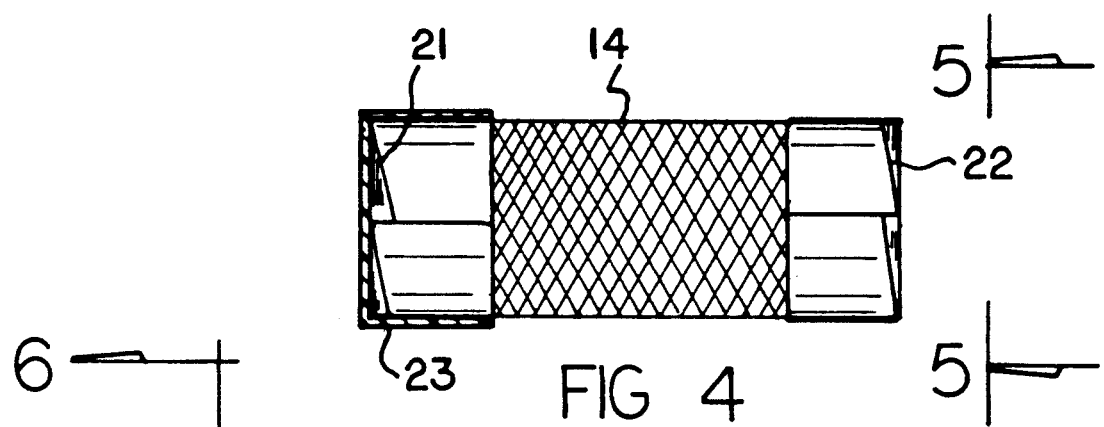
FIG. 4 is an orthographic view, taken along the lines 4—4 of FIG. 3 in the direction indicated by the arrows.
Figure 5:
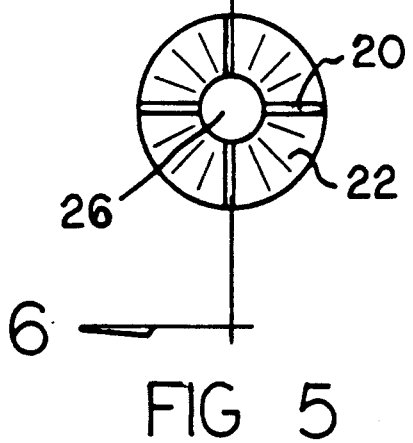
FIG. 5 is an orthographic view, taken along the lines 5—5 of FIG. 4 in the direction indicated by the arrows.
Figure 6:
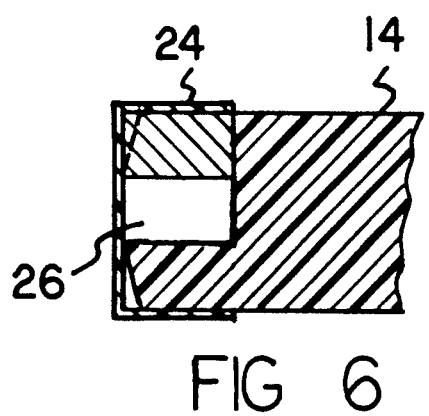
FIG. 6 is an orthographic view, taken along the lines 6—6 of FIG. 5 in the direction indicated by the arrows.
Figure 7:
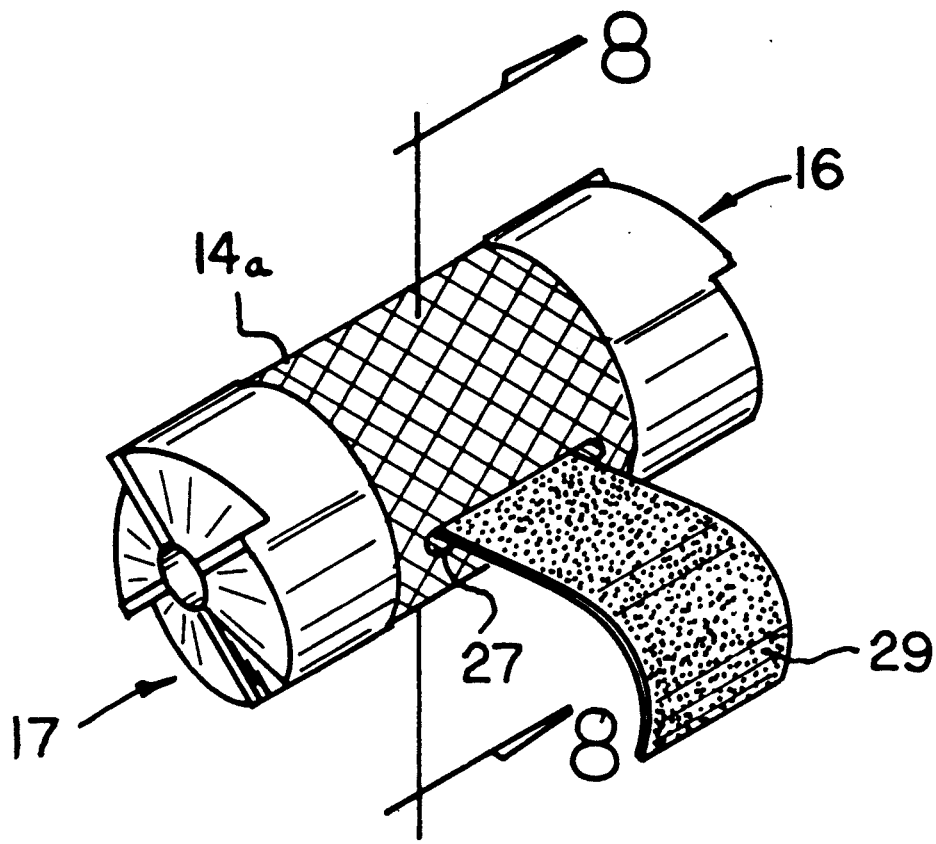
FIG. 7 is an isometric illustration of a modified aspect of the invention.
Figure 8:
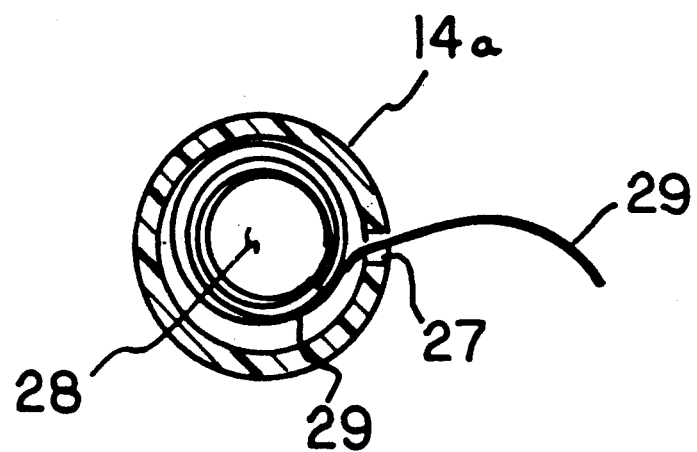
FIG. 8 is an orthographic view, taken along the lines 8—8 of FIG. 7 in the direction indicated by the arrows.

With reference now to the drawings, and in particular to FIGS. 1 to 10 thereof, a new and improved marine battery terminal cleaner tool embodying the principles and concepts of the present invention and generally designated by the reference numeral 10 will be described.

More specifically, the marine battery terminal cleaner tool 10 of the instant invention essentially comprises the use of the tool structure to clean an associated marine battery 11 having respective first and second terminal posts 12 and 13 of respective contrasting first and second diameters. The tool 10 includes a cylindrical body 14 having a roughened textured side wall exterior surface 15. Respective first and second cutting heads 16 and 17 are positioned at opposed ends of the cylindrical body 14, each having formed metallic first and second radial cutter blades 19 and 20 integrally formed to the respective first and second end walls 21 and 22. The first and second end walls 21 and 22 are located on opposed ends of the axis 18 of the body 14. Each of the end walls comprises a plurality of planar surface segments with each segment being angularly oriented relative to the axis 18. The cutter blades 19 and 20, formed on the respective end walls 21 and 22 are orthogonally oriented relative to of the axis 18 of the body 14. Further, first and second bores 25 and 26 are coaxially directed into the cylindrical body through the first and second end walls 21 and 22, with the first and second bores of respective diameters equal to the first and second diameters respectively to accommodate the first and second terminal posts 12 and 13 of the marine battery 11 to properly align the cleaning tool relative to each respective terminal. The cutter blades effect a cleaning of the respective first and second terminals of the battery in surrounding relationship relative to the terminals 12 and 13 when the first and second terminals 12 and 13 are received within respective first and second bores 25 and 26. It should be noted that a respective first and second cover cap 23 and 24 is arranged for frictionally engaging opposed ends of the first and second cutter heads 16 and 17 to afford protection to the cutter heads, as well as to an individual in use of the organization.

The apparatus, as illustrated in the FIGS. 7-10, includes a modified cylindrical body 14a having a housing cavity 28 therewithin between the respective first and second cutting heads 16 and 17. Positioned in communication with the cavity 28 is a side wall slot 27 arranged parallel to the axis 18. The cavity 28 is arranged to accommodate an emery paper roll 29 typically formed of an abrasive flexible web, with a leading edge directed through the slot 27 for use by an individual to accommodate cleaning of various contours of an associated marine battery 11 not accommodated by the first and second cutting heads 16 and 17, and more specifically, the first and second blades 19 and 20.

Figure 9:
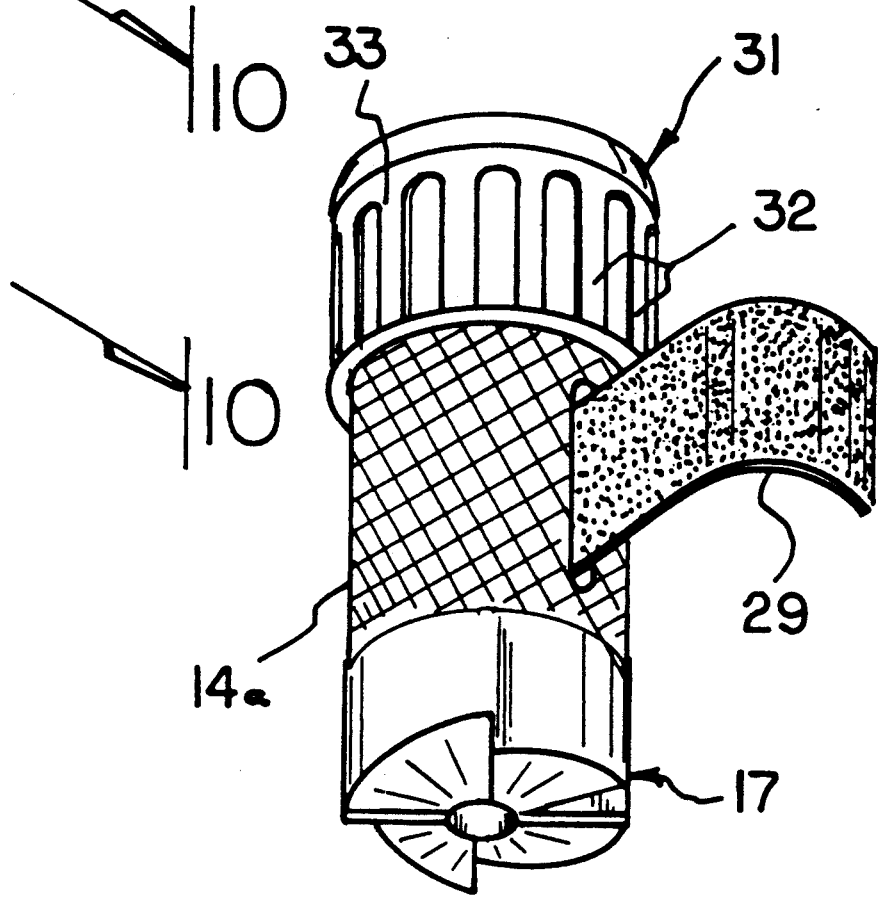
FIG. 9 is an isometric illustration of the invention mounting a protective magnetic cap.
Figure 10:
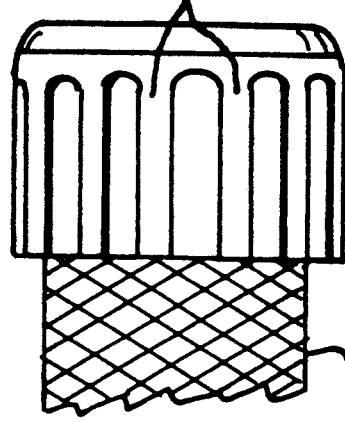
FIG. 10 is an orthographic view, taken along the lines 10—10 of FIG. 9 in the direction indicated by the arrows.

The FIGS. 9 and 10 further indicate the use of a magnetic cap 31 arranged for positioning upon at least one of the cutting heads for affording protection to an individual, as well as to permit magnetic securement of the tool during periods of non-use to accommodate ease of storage of the organization. The magnetic cap 31 is formed with a cylindrical skirt 33 having parallel ribs 32 to enhance manual engagement of the cap 31 and the tool structure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A marine battery terminal cleaner tool, comprising:
   an elongate cylindrical body, the cylindrical body having a cylindrical body side wall, the side wall including a roughened and textured side wall exterior surface, and
   the cylindrical body defined about an elongate axis, with a first cutting head and a second cutting head fixedly mounted to the cylindrical body at opposed ends thereof coaxially aligned with the axis, and
   the first cutting head includes a first end wall comprising a plurality of first planar surface segments, each of said first segments being angularly oriented relative to the axis, the second cutting head includes a second end wall comprising a plurality of second planar surface segments, each of said second segments being angularly oriented relative to the axis, with the first end wall including a plurality of first cutter blades integrally mounted thereon, and the second end wall including a plurality of second cutter blades integrally mounted thereon, wherein the first cutter blades are orthogonally oriented relative to the axis, the second cutter blades are orthogonally oriented relative to the axis, and
   the first end wall includes a first bore directed into the first cutting head defined by a first diameter, and the second cutting head includes a second bore directed into the second end wall defined along the axis and defined by a second diameter, wherein the first diameter is less than the second diameter, and at least one cap arranged for securement respectively about the first cutting head of the second cutting head selectively, wherein the cap is of a ferromagnetic material, the first cutting head and the second cutting head are each of a ferrous material to effect magnetic adherence of the cap relative to the first cutting head.

2. A tool as set forth in claim 1 wherein the cylindrical body is tubular and includes a housing cavity therewithin between the first cutting head and the second cutting head, and a side wall slot is directed through the cylindrical body side wall parallel to the axis, and a flexible abrasive roll is mounted within the cavity, the abrasive roll having an abrasive texture coextensively about at least an exterior surface of the roll, and the roll including a leading web, with the leading web arranged for projection through the slot.

* * * * *